United States Patent [19]
Reed et al.

[11] Patent Number: 5,165,516
[45] Date of Patent: Nov. 24, 1992

[54] THREE-WAY TRANSFER CONVEYOR

[75] Inventors: David B. Reed; William A. Fultz, both of Louisville, Ky.

[73] Assignee: Interlake Companies, Inc., Shepherdsville, Ky.

[21] Appl. No.: 753,010

[22] Filed: Aug. 23, 1991

Related U.S. Application Data

[63] Continuation of Ser. No. 512,119, Apr. 20, 1990, abandoned.

[51] Int. Cl.⁵ .............................................. B65G 47/34
[52] U.S. Cl. ............................. 198/372; 198/809; 198/371
[58] Field of Search ............... 198/369, 371, 372, 577, 198/809

[56] References Cited

U.S. PATENT DOCUMENTS

| | | | |
|---|---|---|---|
| 859,595 | 7/1907 | Camp | 198/371 |
| 1,432,086 | 10/1922 | Plonka | 198/371 |
| 2,666,518 | 1/1954 | Page | 198/371 |
| 3,104,004 | 9/1963 | Poel et al. | 198/372 X |
| 3,214,002 | 10/1965 | Kirkpatrick et al. | 198/370 |
| 3,497,051 | 2/1970 | Gugin | 198/371 X |
| 3,642,113 | 2/1972 | Burgis | 198/372 |
| 4,174,774 | 11/1979 | Bourgeois | 198/809 X |
| 4,200,178 | 4/1980 | Gunti | 198/372 |
| 4,541,520 | 9/1985 | Greenlee, III | 198/372 |
| 4,730,718 | 3/1988 | Fazio et al. | 198/372 |
| 4,746,003 | 5/1988 | Yu et al. | 198/372 X |
| 4,747,477 | 5/1988 | Benz et al. | 198/372 X |
| 4,798,275 | 1/1989 | Leemkuil et al. | 198/809 X |
| 4,880,099 | 11/1989 | Leemkuil et al. | 198/371 |
| 4,962,841 | 10/1990 | Kloosterhouse | 198/809 X |

FOREIGN PATENT DOCUMENTS

| | | | |
|---|---|---|---|
| 0333952 | 9/1989 | European Pat. Off. | 198/372 |
| 1910417 | 10/1969 | Fed. Rep. of Germany | 198/577 |
| 2849488 | 5/1979 | Fed. Rep. of Germany | 198/372 |
| 3446805 | 7/1986 | Fed. Rep. of Germany | 198/372 |
| 0075318 | 6/1981 | Japan | 198/369 |
| 1-56226 | 6/1989 | Japan | 198/372 |

Primary Examiner—Robert P. Olszewski
Assistant Examiner—James R. Bidwell
Attorney, Agent, or Firm—Theresa F. Camoriano

[57] ABSTRACT

A conveyor transfer unit includes conveyor rollers driven by a drive shaft and transfer belts which are selectively driven to the left and to the right at right angles to the conveyor rollers.

15 Claims, 5 Drawing Sheets

THREE-WAY TRANSFER CONVEYOR

This is a continuation of U.S. Patent application Ser. No. 07/512,119, filed Apr. 20, 1990, now abandoned.

BACKGROUND OF THE INVENTION

The present invention pertains to conveyors, and, in particular, to a transfer apparatus for conveyors.

When articles are moving along a conveyor, it is sometimes desirable to remove some articles from the main conveyor line and transfer them onto alternate conveyors or onto a platform or other device. U.S. Pat. No. 4,730,718 "Fazio" discloses a transfer station at which the articles may be transferred off the main conveyor to the left or to the right, or the articles may be permitted to continue travelling along the main conveyor path.

There are several drawbacks to the arrangement shown in the Fazio patent. For example, that design requires that there be enough space between the conveyor rollers for the width of two transfer belts—one moving to the left and one moving to the right. This leaves a fairly wide gap between conveyor rollers which may create some instability in conveying the products when the products are moving straight through the transfer station. In addition, the transfer belts in the Fazio design are constantly driven and are intermittently stretched as the transfer direction is changed. This creates a situation in which the transfer belts experience substantial wear. It also consumes more power than would be consumed if the transfer belts could be driven only when they were needed. The Fazio design also has many moving parts, with two sets of transfer belts being shifted up and down.

SUMMARY OF THE INVENTION

The present invention provides a conveyor which can transfer articles in three directions, while overcoming some of the deficiencies of the prior art.

The present invention requires less space between the rollers in the transfer portion and therefore provides a more stable conveying surface.

The present invention does not require two vertical shift mechanisms for each transfer belt as in the prior art, instead requiring only one vertical shift mechanism per transfer station, thereby eliminating many moving parts.

The present invention provides this economy of parts by providing for each transfer belt to rotate in two different directions.

In the present invention, the transfer belts are driven only when they are needed for transferring articles off to the left or right or onto the main conveyor from the left or right, thus conserving power and reducing wear on the transfer belts.

In the present invention, the entire transfer belt is shifted up and down for the transfer function, eliminating the problem of stretching of the transfer belt.

The present invention also provides a more positive drive than in the prior art, with less opportunity for slippage in the event of a heavy load.

BRIEF DESCRIPTION OF THE DRAWINGS

FIG. 7 is a plan view of the drive roller, showing how it pivots to engage each friction wheel;

FIG. 8 is a broken-away exploded perspective view showing the piston-cylinder arrangement for shifting the drive roller relative to the shiftable frame;

DESCRIPTION OF THE PREFERRED EMBODIMENT

Figure 1:
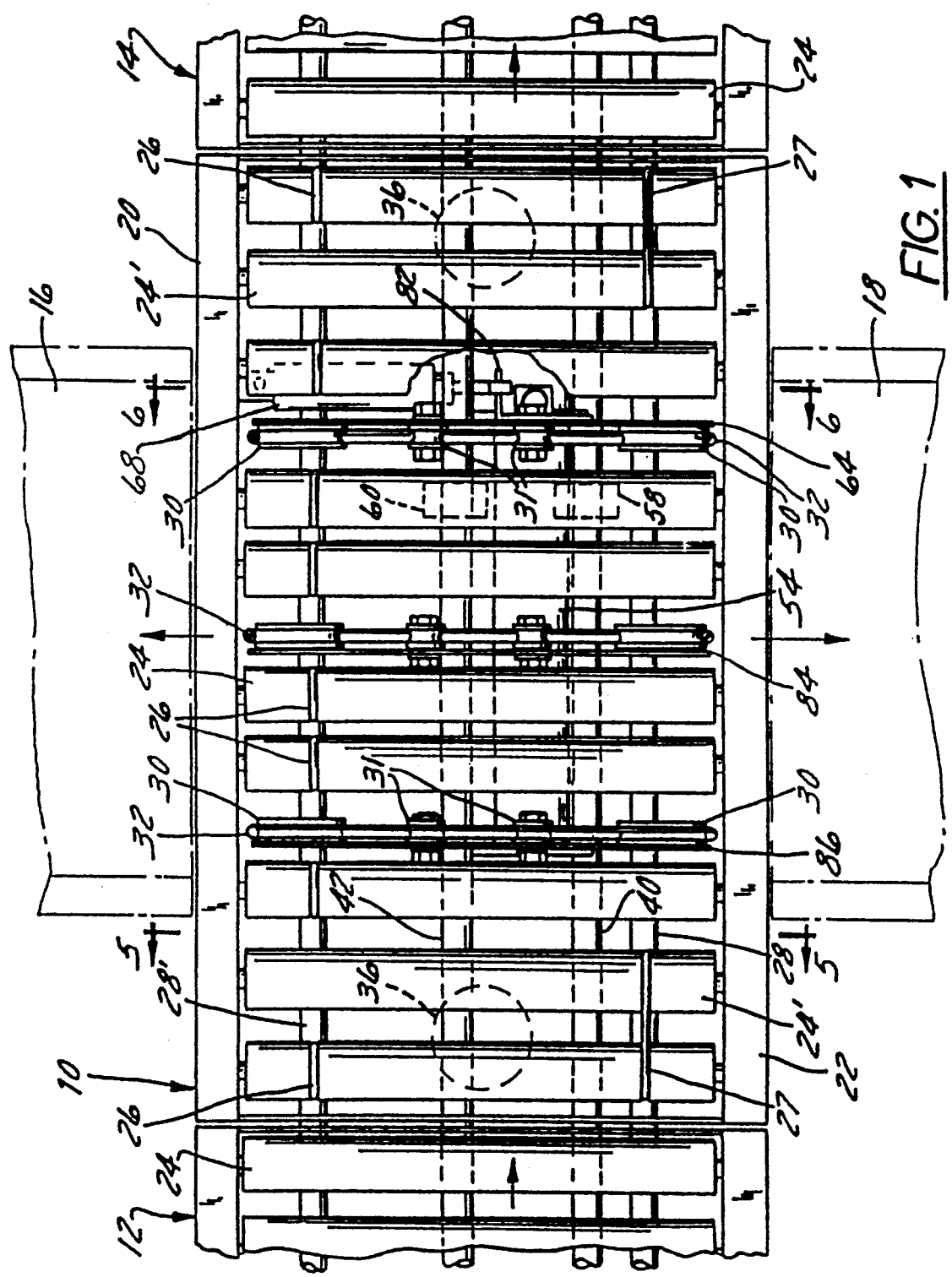
FIG. 1 is a top plan view of the transfer mechanism of the present invention, with some of the lower portions eliminated, because they cannot be seen clearly enough from this view.

As shown in FIG. 1, the three-way transfer mechanism of the present invention is intended to be used in conjunction with a feeder conveyor 12, a straight exit conveyor 14, and right and left exit conveyors 16, 18, respectively. The feeder and exit conveyors 12, 14 are preferably made up of lineshaft-driven rollers 24, as shown. The right and left exit conveyors 16, 18 may be any type of conveyor, including lineshaft-driven rollers, conveyor belts, and so forth. The side exit conveyors 16, 18 could even be chutes or other known devices for carrying articles off of the main conveyor.

The frame of the transfer conveyor includes first and second side rails 20, 22, on which are mounted the first and second ends of the conveyor rollers 24. The conveyor rollers 24 are driven by o-rings 26, each of which wraps around the drive shaft 28 and around its respective roller 24. Two of the conveyor rollers 24' are not driven directly by the drive shaft but are driven by an o-ring 27 from the adjacent roller 24.

The conveyor rollers 24 carry articles directly from the feeder conveyor 12 to the straight exit conveyor 14. In order to transfer articles onto the right and left exit conveyors, 16, 18, another mechanism is used. It can be seen in FIG. 1 that, at three of the spaces between the conveyor rollers 24 are located sets of large sheaves 30, small sheaves 31, and transfer belts 32. Two of the transfer belts 32 are shown in section in FIG. 1. Each transfer belt 32 wraps around its respective set of sheaves 30, 31 and rotates at right angles to the conveyor rollers 24. In the preferred embodiment, the transfer belts 32 are large o-rings, but other types of belts could be used instead. Also, in some applications, different numbers of transfer belts 32 might be used.

These transfer belts 32 can be driven clockwise, so as to carry articles off to the right exit conveyor 16, and can be driven counterclockwise to carry articles onto the left exit conveyor 18. The mechanism for driving the transfer belts will be described in detail later. It is also possible to reverse the direction of all the drives, so the conveyors 16, 18, and 14 would feed articles onto the conveyor 12.

Each set of sheaves 30, 31 which support the transfer belts 32 is mounted on one of the three vertical plates 64, 84, 86 of a shiftable frame 34, which can be shifted up and down by means of air bags 36. The sheaves 30, 31 are mounted on their respective plates by means of stub shafts, and all the sheaves mounted on a given vertical plate are mounted in a substantially co-planar arrangement, so that the transfer belt 32, when wrapped around the set of sheaves 30, 31, lies in a single plane. When articles are to be sent straight through the sorter station from the feeder conveyor 12 to the straight exit conveyor 14, the air bags 36 are in the deflated position (as in FIG. 3), with the top surface of the transfer belts 32 located below the top surface of the conveyor rollers 24. When the articles are to be transferred onto the right or left exit conveyor 16, 18, the air bags 36 are inflated, as in FIG. 4, and the shiftable frame 34 moves up, so that the top surface of the transfer belts 32 is located above the top surface of the conveyor rollers 24 and will therefore be the portion in contact with the articles being conveyed.

Figure 3:
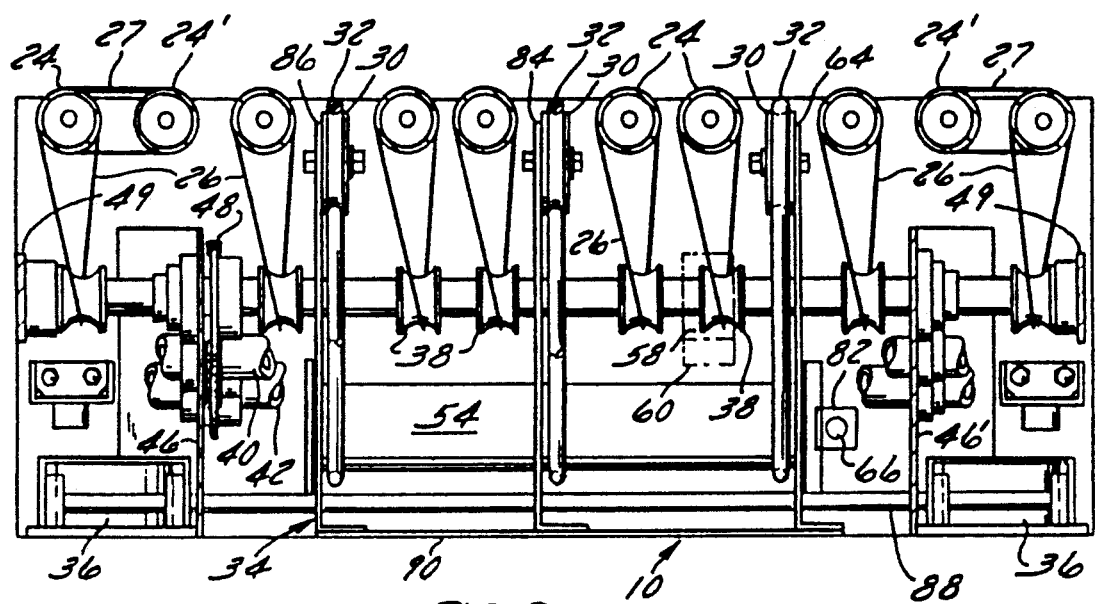
FIG. 3 is a side sectional view of the transfer mechanism of FIG. 1 with more of the details added and the shiftable frame in the "down" position.
Figure 4:
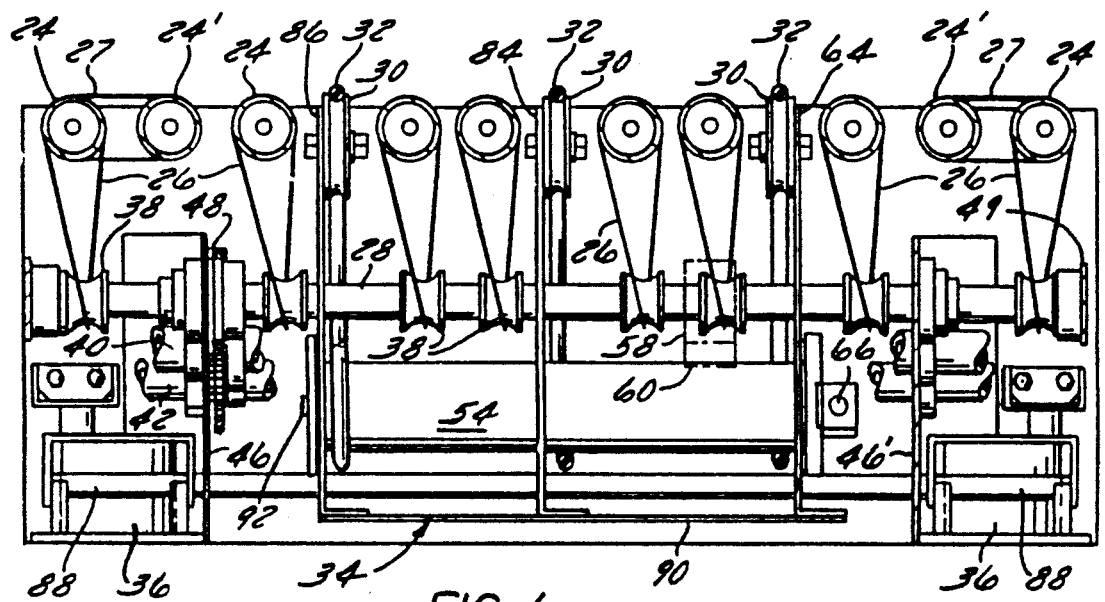
FIG. 4 is a side sectional view of the transfer mechanism of FIG. 1 with the same details as FIG. 3 and with the shiftable frame in the "up" position.

As shown in FIGS. 3 and 4, the drive shaft 28 runs lengthwise under the transfer conveyor 10. At each end of the transfer conveyor 10, the drive shaft 28 terminates in a sprocket 49 shown best in FIGS. 3 and 4. The drive shaft 28 of the transfer conveyor 10 is then connected to the end sprocket of the adjacent drive shaft portion of the feeder and exit conveyors 12, 14 by means of a double-width chain (not shown) which wraps around the two adjoining end sprockets. This is a standard method for connecting lengths of drive shaft in the conveyor industry. Drive shaft pulleys 38 are mounted on the drive shaft 28. Each small O-ring 26 wraps around its respective drive shaft pulley 38 and around its respective conveyor roller 24, fitting into a groove in the conveyor roller 24, so, when the drive shaft 28 rotates, it drives the conveyor rollers 24 by means of the o-rings 26. It is intended in the preferred embodiment that the drive shaft 28 will be driven continuously, so the conveyor rollers 24 will also be driven continuously.

Figure 5:
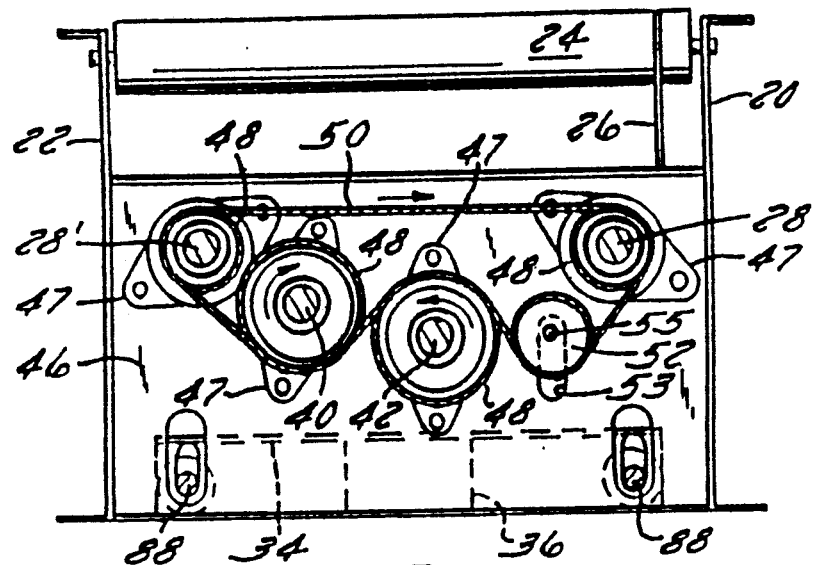
FIG. 5 is a view along the section 5—5 of FIG. 1 with the details added.

The transfer belts 32 are also driven by the drive shaft 28. As shown in FIG. 5, the drive shaft 28, a first friction wheel shaft 40, a second friction wheel shaft 42, and a cross-over shaft 28' are all mounted on a stationary plate 46 near the rear of the transfer conveyor by means of flange bearings 47 which are bolted onto the plate 46. The drive shaft 28, first and second friction wheel shafts 40, 42, and the cross-over shaft 28' run parallel to each other. Each of these shafts mounts to another fixed plate 46' near the other end of the transfer station 10 by means of another set of flange bearings (not shown). Each of the shafts 28, 28', 40, 42 has a sprocket 48 mounted on it between the fixed plate 46 and the rear shiftable plate 86. These sprockets 48 are mounted in a substantially co-planar arrangement. As shown in FIG. 5, a chain 50 wraps around all those sprockets 48 in such a way that, when the drive shaft 28 rotates in a clockwise direction, the first friction wheel shaft 40 rotates in a clockwise direction, and the second friction wheel shaft 42 rotates in a counter-clockwise direction. A tensioning roll 52 is also used to keep the chain 50 properly tensioned. The tensioning roll 52 is mounted in a slot 53 in order to keep the chain tight. To mount the tensioning roll 52, the tensioning roll shaft 55 is positioned in the slot 53 in the right place to keep the chain tight, and the bolt on the tensioning roll shaft 55 is simply tightened to keep the tensioning roll 52 in place. It should be noted that the cross-over shaft 28' can serve as an alternative drive shaft, permitting the conveyor to be driven from either side. However, in this embodiment, the cross-over shaft 28' simply is driven by the drive shaft 28 through the chain 50.

Figure 6:
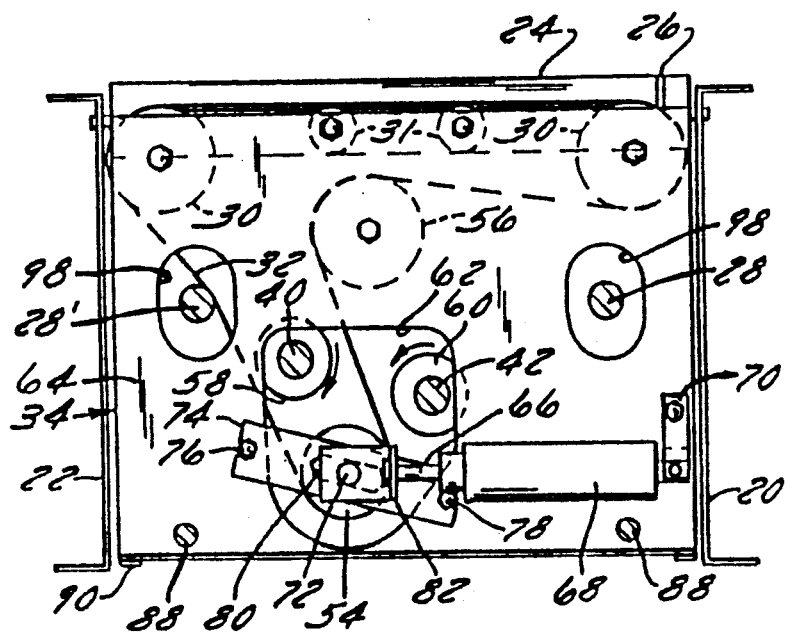
FIG. 6 is a view along the section 6—6 of FIG. 1, with the details added.

FIG. 6 is a view of a portion of the shiftable frame 34, showing the sheaves 30, 31 mounted on the first end plate 64 of the shiftable frame 34. The center plate 84 and second end plate 86 of the shiftable frame 34 have large sheaves 30 and small sheaves 31 mounted on them in a similar fashion as shown in FIG. 1. The first friction wheel 58 and second friction wheel 60 are mounted on their respective friction wheel shafts 40, 42, which pass through a hole 62 in the end plate 64 of the shiftable frame 34. The friction wheels 58, 60 are fixed to their respective shafts 40, 42 between the first end plate 64 of the shiftable frame 34 and the center plate 84 of the shiftable frame 34 as shown in FIGS. 1 and 6. The two friction wheels 58, 60 lie substantially in the same plane.

A piston and cylinder 68 are also mounted on the end plate 64 of the shiftable frame 34, as shown in FIGS. 6 and 8. The cylinder 68 is bolted onto a bracket 70, which, in turn, is bolted to the end plate 64, permitting the cylinder 68 to pivot in the plane of the end plate 64. The piston rod 66 is mounted on the end plate 64 and is connected to the shaft 72 of the drive roller 54 by means of a two-piece bracket. The first bracket piece 74 is bolted to the end plate 64 by means of two bolts 76, 78 and has a central elongated hole 80 through which the shaft 72 of the drive roller 54 extends. The second bracket piece 82 is a simple L-shaped piece which is fastened to the piston rod 66 on one leg and to the shaft 72 of the drive roller on the other leg.

This mounting arrangement permits the front end of the shaft 72 of the drive roller 54 to be shifted along the central elongated hole 80 as the piston rod 66 moves in and out of the cylinder. Of course, the shiftable frame 34 moves up and down as the air bags 36 are inflated and deflated, and both ends of the drive roller shaft 72 move up and down with the shiftable frame 34.

The shiftable frame 34 is made up of several parts. The first end plate 64, which can be seen best in FIGS. 6 and 8, is identical to the center plate 84 and to the second end plate 86. These three plates 64, 84, 86 are rigidly connected to each other by means of the rods 88, which extend through holes in all the plates, and by means of the bottom plate 90, which is welded to the bottoms of the end plates and center plate 64, 86, 84. The rods 88 extend to the air bags 36 and are raised and lowered by the air bags 36. As shown in FIG. 7, the drive roller 54 is connected to the second end plate 86 by means of a bracket 92, which is bolted to the second end plate 86 and extends across the large hole 62 in the second end plate 86. The bracket 92 has a smaller hole 94 in which is mounted a bushing 96, which permits the drive roller 54 to pivot slightly at the second end as the piston rod 66 moves in and out at the first end. The drive roller 54 is free to move in the large hole 62 in the center plate 84.

It should be noted that all three plates of the shiftable frame 34 include enlarged openings 98 which allow the shafts which are fixed with respect to the conveyor side rails 20, 22 to extend through the shiftable frame 34 without interfering with the plates 64, 84, 86 as they shift up and down. For example, the drive shaft 28 extends through the openings 98, and the alternative drive shaft 28' also passes through the enlarged openings 98. The first and second friction wheel shafts 40, 42 pass through the large opening 62 in the shiftable plates 64, 84, 86.

Figure 9:
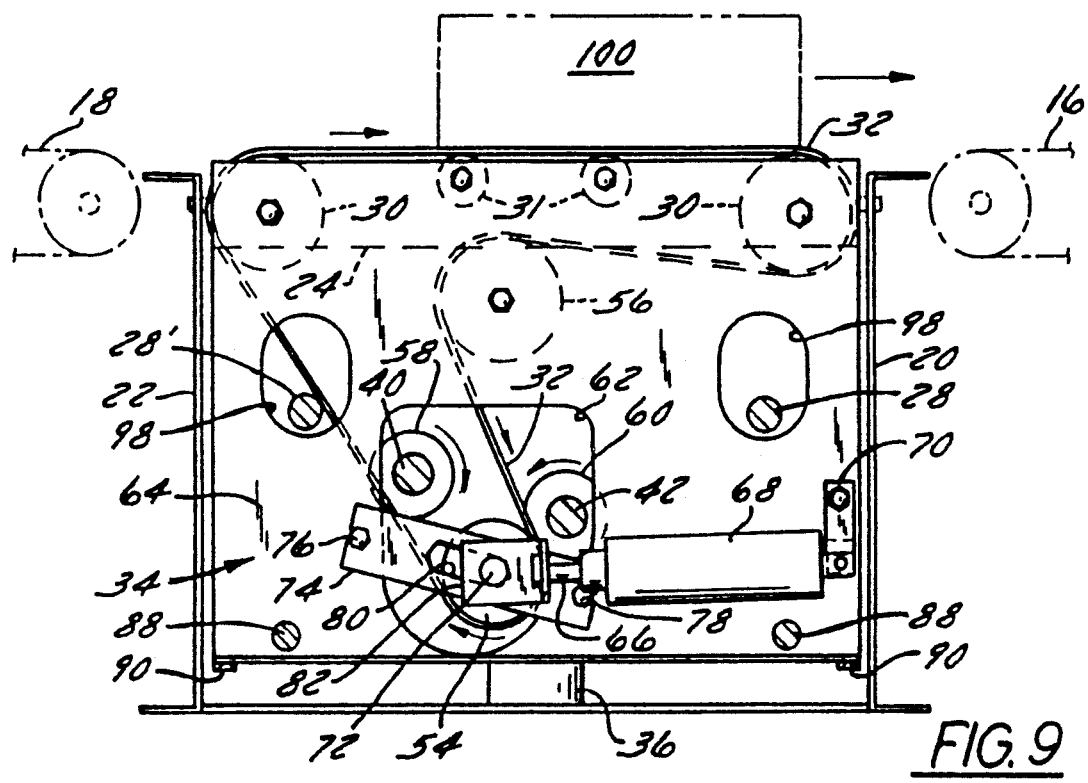
FIG. 9 is a front sectional view of the shiftable frame mechanism, showing an article being transferred to the right side.
Figure 10:
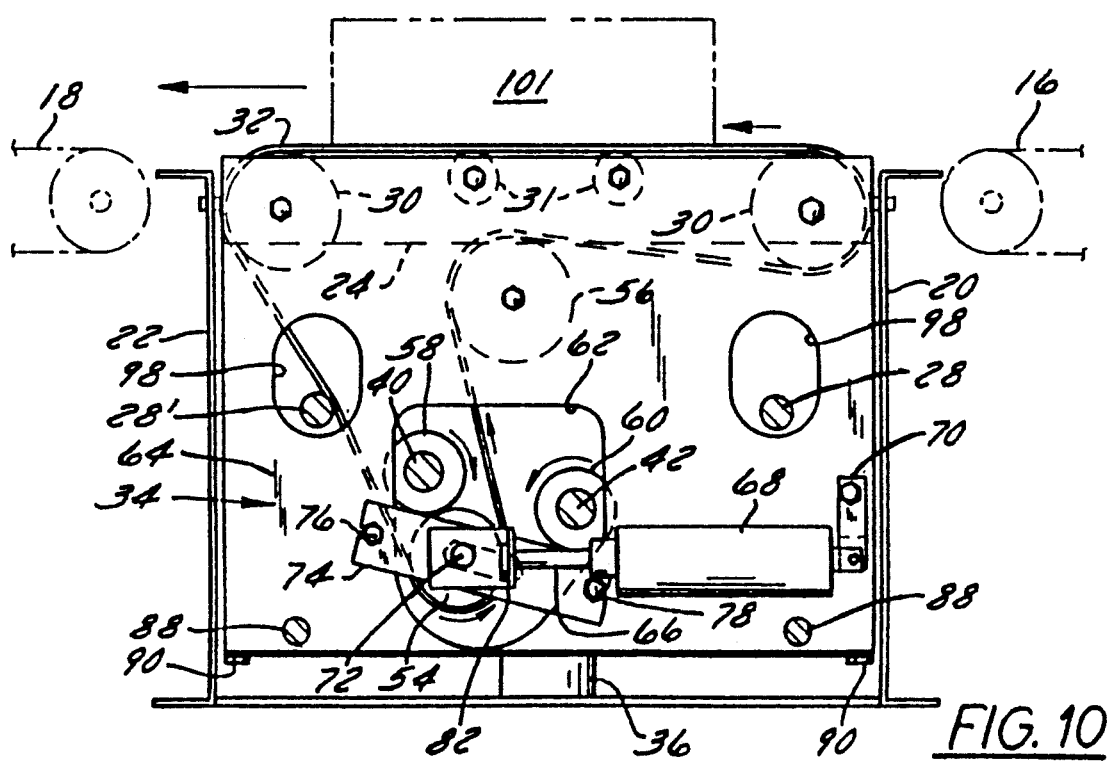
FIG. 10 is the same view as FIG. 9, showing the article being transferred to the left side.

FIGS. 9 and 10 show the transfer belts 32 as they are driven in the two different directions. In FIG. 9, a package 100 has arrived at the transfer unit and is to be shifted onto the right side conveyor 16. The control system has caused the air bags 36 to fill and shift the shiftable frame 34 upward, causing the top surface of the three transfer belts 32 to be raised slightly above the top surface of the conveyor rollers 24. The controller has also caused the piston rod 66 to be retracted into the cylinder 68, causing the drive roller to come into contact with the second friction wheel 60. The second friction wheel is rotating in a counterclockwise direction, so it causes the drive roller 54 to rotate in a clockwise direction, as shown. This causes the three transfer belts 32, which are looped around the drive roller 54, around the sheaves 30, 31, and around the tensioning sheave 56, to rotate in a clockwise direction, causing the package 100 to be transferred off to the right side conveyor 16.

In FIG. 10, the controller has again caused the shiftable frame 34 to be shifted upward by means of the air bags 36. However, in this case, the controller has caused the piston to be pushed outward, bringing the drive roller 54 into contact with the first friction wheel 58. The first friction wheel 58 is rotating in a clockwise direction, and friction between the friction wheel 58 and the drive roller 54 causes the drive roller to rotate in a counterclockwise direction. Now, the three transfer belts 32 which are looped around the drive roller 54 are driven in a counterclockwise direction, causing the package 101 to be carried off to the left side conveyor 18.

When the air bags 36 are deflated and the shiftable frame 34 is in the down position, as in FIG. 3, the drive roller 54 is below the two friction wheels 58, 60 and does not contact them, regardless of the position of the piston rod 66. This means that the drive roller 54 and the transfer belts 32 are driven only when needed to transfer articles. This conserves energy and greatly reduces wear and tear on the parts.

Figure 2:
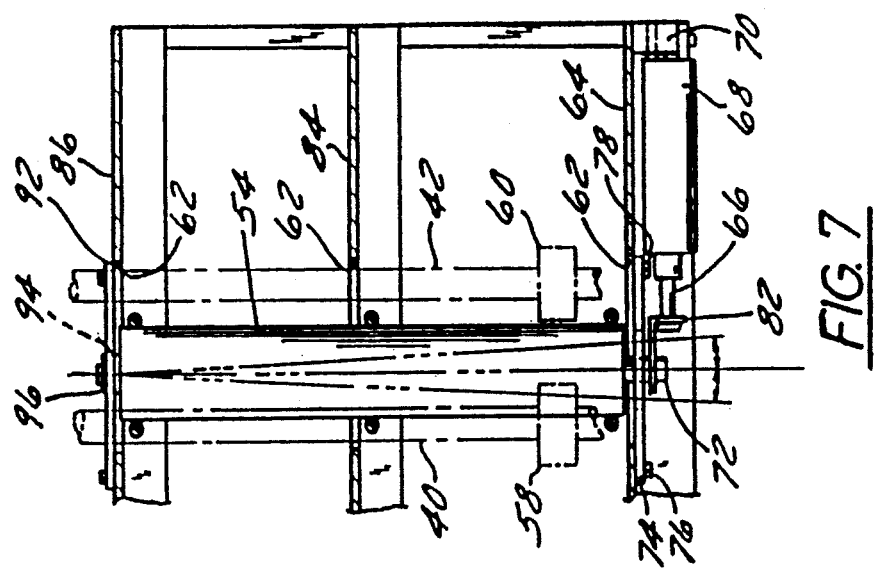
FIG. 2 is a schematic of a pneumatic control system for the transfer mechanism of FIG. 1.

A schematic drawing of the pneumatic control system is shown in FIG. 2. The control system includes an air compressor (not shown), which supplies air to the two sides of the cylinder 68 and to the air bags 36. An electronic sensor and central controller (not shown) reads a bar code on the package 100 or 101 or otherwise senses the package and determines the route that particular package is to take. The program controller (not shown) tracks the package by some known means and then triggers the solenoid valves 102 to open or close as needed to shift the piston back and forth in the cylinder 68 and to inflate and deflate the air bags 36 as required. Many control systems are known in the art to perform this function.

It will be obvious to those of ordinary skill in the art that modifications may be made to the embodiment described above without departing from the scope of the invention.

What is claimed is:

1. A transfer conveyor, comprising:
  a conveyor frame, including first and second side rails;
  a plurality of conveyor rollers having first and second ends, said conveyor rollers being mounted across the conveyor frame with the first ends mounted in the first side rails and the second ends mounted in the second side rails;
  a drive shaft extending along the transfer conveyor and adapted to be driven in a given direction of rotation;
  means for driving the conveyor rollers from the drive shaft;
  a shiftable frame, including means for shifting the shiftable frame up and down relative to the conveyor frame;
  a set of sheaves mounted in a coplanar arrangement on the shiftable frame;
  at least one transfer belt mounted on the sheaves; and
  means for selectively driving said transfer belt in the direction of rotation of the drive shaft and opposite to the direction of rotation of the drive shaft, such that, when the shiftable frame is shifted upward and the transfer belt is rotating in the direction of rotation of the drive shaft, articles will be transferred in one direction, and, when the shiftable frame is shifted upward and the transfer belt is rotating opposite to the direction of rotation of the drive shaft, articles will be transferred in the opposite direction, and further comprising first and second friction wheel shafts and a drive roller extending substantially parallel to the drive shaft; sprockets mounted on the drive shaft and on the first and second friction wheel shafts, and a chain wrapped around the sprockets in such a manner that, when the drive shaft rotates in a given direction of rotation, it drives one of the friction wheel shafts in that direction and the other of the friction wheel shafts in the opposite direction; first and second friction wheels mounted on the first and second friction wheel shafts, respectively; wherein the drive roller is adapted to move relative to the friction wheel shafts, such that, when it contacts one of the friction wheels, it is driven by that friction wheel in one direction, and, when it contacts the other of the friction wheels, it is driven by that friction wheel in the opposite direction.

2. A transfer conveyor as recited in claim 1, wherein said transfer belt is wrapped around said drive roller and is driven by the drive roller.

3. A transfer conveyor, comprising:
  a conveyor frame, including first and second side rails;
  a plurality of conveyor rollers mounted parallel to each other on the conveyor frame, each of said rollers having a first end mounted on the first side rail and a second end mounted on the second side rail;
  a drive shaft extending lengthwise along the conveyor, perpendicular to the direction of the conveyor rollers;
  a plurality of small O-rings, each of said small O-rings looping around the drive shaft and around its respective conveyor roller, so as to transfer power from the drive shaft to its respective conveyor roller;
  a sprocket mounted on said drive shaft;
  first and second friction wheel shafts extending parallel to said drive shaft;
  first and second friction wheel sprockets mounted on said first and second friction wheel shafts, respectively;
  first and second friction wheels mounted on said first and second friction wheel shafts, respectively;
  a chain wrapped around the sprockets of the drive shaft and of the first and second friction wheel shafts such that, when the drive shaft rotates in a clockwise direction, the chain drives one of the friction wheel shafts in a clockwise direction and drives the other friction wheel shaft in a counterclockwise direction;

a shiftable frame located between the side rails of the conveyor frame, including means for shifting the shiftable frame up and down relative to the conveyor frame;

first and second stub shafts extending parallel to the drive shaft and mounted on the shiftable frame;

first and second sheaves mounted on said first and second stub shafts, respectively;

a drive roller mounted on the shiftable frame;

means for shifting the drive roller between first and second positions relative to the shiftable frame;

a transfer belt mounted around the sheaves and the drive roller and between two adjacent conveyor rollers such that, when the shiftable frame is shifted upward, the portion of the transfer belt between the sheaves is slightly above the conveyor rolls, and, when the drive roller is shifted in a first direction relative to the shiftable frame, the drive roller contacts the first friction wheel and drives in one direction, and, when the drive roller is shifted in a second direction relative to the shiftable frame, the drive wheel contacts the second friction wheel and drives in the opposite direction.

4. A transfer conveyor, comprising:
a conveyor frame, including first and second side rails;
a plurality of conveyor rollers having first and second ends, said conveyor rollers being mounted across the conveyor frame with the first ends mounted in the first side rails and the second ends mounted in the second side rails;
a drive shaft extending along the transfer conveyor and adapted to be driven in a given direction of rotation;
means for driving the conveyor rollers from the drive shaft in a direction of rotation transverse to the direction of rotation of the drive shaft;
a shiftable frame, including means for shifting the shiftable frame up and down relative to the conveyor frame;
a set of sheaves mounted in a coplanar arrangement on the shiftable frame;
at least one transfer belt mounted on the sheaves; and
means for transmitting power from said drive shaft to said transfer belt, so as to selectively drive said transfer belt in the direction of rotation of the drive shaft and opposite to the direction of the drive shaft, while said drive shaft is in continuous operation, such that, when the shiftable frame is shifted upward and the transfer belt is rotating in the direction of rotation of the drive shaft, articles will be transferred in one direction, and, when the shiftable frame is shifted upward and the transfer belt is rotating opposite to the direction of rotation of the drive shaft, articles will be transferred in the opposite direction;
wherein said means for transmitting power from said drive shaft to said transfer belt includes:
first and second intermediate shafts lying parallel to and driven by said drive shaft, said first intermediate shaft being driven in the same direction of rotation as the drive shaft, and said second intermediate shaft being driven in a direction opposite to the direction of rotation of said drive shaft; and
a drive roller lying substantially parallel to said drive shaft, wherein said transfer belt is wrapped around said drive roller; and
means for selectively driving said drive roller from said first and second intermediate shafts.

5. A transfer conveyor as recited in claim 4, wherein said drive roller is mounted so as to move with said shiftable frame so that the length of said transfer belt remains constant when the shiftable frame is shifted.

6. In a transfer conveyor, comprising a stationary conveyor frame; rollers mounted on said stationary conveyor frame; a drive shaft extending transverse to said rollers and having a direction of rotation; means for transmitting power from said drive shaft to said rollers to drive said rollers; a shiftable frame; and a transfer belt mounted on said shiftable frame; the improvement comprising:
means for transmitting power from said drive shaft to said transfer belt so as to selectively drive said transfer belt in the direction of rotation of said drive shaft and opposite to the direction of rotation of said drive shaft while said drive shaft is continuously operating,
wherein said means for transmitting power from said drive shaft to said transfer belt includes:
first and second intermediate shafts extending substantially parallel to said drive shaft;
means for transmitting power from said drive shaft to said first and second intermediate shafts, such that said first intermediate shaft rotates in the direction of rotation of said drive shaft and said second intermediate shaft rotates opposite to the direction of rotation of said drive shaft; and
means for selectively transmitting power from said first and second intermediate shafts to said transfer belt, such that, when power is transmitted from said first intermediate shaft to said transfer belt, the transfer belt rotates in one direction and transfers articles off the conveyor in one direction, and, when power is transmitted from said second intermediate shaft to said transfer belt, the transfer belt rotates in the opposite direction and transfers articles off the conveyor in the opposite direction.

7. A transfer conveyor as recited in claim 6, and further comprising:
a drive roller extending substantially parallel to said drive shaft and to said first and second intermediate shafts;
wherein said transfer belt wraps around a portion of said drive roller;
first and second friction wheels mounted on said first and second intermediate shafts, respectively;
and means for selectively moving said drive roller into and out of contact with said first and second friction wheels.

8. A transfer conveyor as recited in claim 7, wherein said drive roller is mounted so as to move with said shiftable frame so that the length of said transfer belt remains constant when the shiftable frame is shifted.

9. A transfer conveyor, comprising:
a conveyor frame, including first and second side rails;
a plurality of conveyor rollers having first and second ends, said conveyor rollers being mounted across the conveyor frame with the first ends mounted in the first side rails and the second ends mounted in the second side rails;

a drive shaft extending along the transfer conveyor and adapted to be driven in a given direction of rotation;

means for driving the conveyor rollers from the drive shaft in a direction of rotation transverse to the direction of rotation of the drive shaft;

a shiftable frame, including means for shifting the shiftable frame up and down relative to the conveyor frame;

a set of sheaves mounted in a coplanar arrangement on the shiftable frame;

at least one transfer belt mounted on the sheaves;

a drive roller, wherein said transfer belt is wrapped around said drive roller; and means for transmitting power from said drive shaft to said drive roller, so as to selectively drive said transfer belt in the direction of rotation of the drive shaft and opposite to the direction of rotation of the drive shaft, while said drive shaft is in continuous operation, such that, when the shiftable frame is shifted upward and the transfer belt is rotating in the direction of rotation of the drive shaft, articles will be transferred in one direction, and, when the shiftable frame is shifted upward and the transfer belt is rotating opposite to the direction of rotation of the drive shaft, articles will be transferred in the opposite direction.

10. In a transfer conveyor, comprising a stationary conveyor frame; rollers mounted on said stationary conveyor frame; a drive shaft extending transverse to said rollers and having a direction of rotation; means for transmitting power from said drive shaft to said rollers to drive said rollers; a shiftable frame; and a transfer belt mounted on said shiftable frame; the improvement comprising:

a drive roller, wherein said transfer belt is wrapped around said drive roller; and further comprising power transmission means for transmitting power from said drive shaft to said drive roller to as to selectively drive said drive roller in a first direction of rotation and in a second direction of rotation opposite to the first direction of rotation, while said drive shaft is continuously operating.

11. A transfer conveyor as recited in claim 10, wherein said drive roller is mounted so as to move with said shiftable frame so that the length of said transfer belt remains constant when the shiftable frame is shifted.

12. In a transfer conveyor as recited in claim 10, wherein said power transmission means is operable only when said shiftable frame is shifted upwards.

13. In a transfer conveyor as recited in claim 10, said power transmission means including:

first and second intermediate shafts extending substantially parallel to said drive shaft;

means for transmitting power from said drive shaft to said first and second intermediate shafts; and means for selectively transmitting power from said first and second intermediate shafts to said drive roller, such that, when power is transmitted from said first intermediate shaft to said drive roller, the drive roller rotates in a first direction, and, when power is transmitted from said second intermediate shaft to said drive roller, the drive roller rotates in the opposite direction.

14. In a transfer conveyor as recited in claim 13, wherein said first intermediate shaft rotates in a first direction of rotation and said second intermediate shaft rotates in the opposite direction.

15. In a transfer conveyor as recited in claim 14, wherein said means for selectively transmitting power from said first and second intermediate shafts to said drive roller includes:

first and second friction wheels mounted on said first and second intermediate shafts, respectively; and means for selectively shifting said drive roller into and out of engagement with said first and second friction wheels.

* * * * *